US012100270B2

(12) United States Patent
Fraser et al.

(10) Patent No.: US 12,100,270 B2
(45) Date of Patent: Sep. 24, 2024

(54) APPARATUS, SYSTEM, AND METHOD FOR BULK CURRENCY NOTE DEPOSITS

(71) Applicant: NCR Atleos Corporation, Atlanta, GA (US)

(72) Inventors: Grant Buchanan Fraser, Perth (GB); John Mannion, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/125,479

(22) Filed: Mar. 23, 2023

(65) Prior Publication Data

US 2023/0230459 A1 Jul. 20, 2023

Related U.S. Application Data

(63) Continuation of application No. 17/690,259, filed on Mar. 9, 2022, now Pat. No. 11,699,332, which is a continuation of application No. 17/238,390, filed on Apr. 23, 2021, now Pat. No. 11,328,563.

(51) Int. Cl.
*G07F 19/00* (2006.01)

(52) U.S. Cl.
CPC .......... *G07F 19/202* (2013.01); *G07F 19/205* (2013.01)

(58) Field of Classification Search
CPC ............................ G07F 19/202; G07F 19/205
USPC .......................................................... 235/379
See application file for complete search history.

(56) References Cited

U.S. PATENT DOCUMENTS

2015/0243119 A1* 8/2015 Hayashi ................ G07D 11/14 194/206
2018/0286164 A1* 10/2018 Lee ...................... G07F 19/205

* cited by examiner

*Primary Examiner* — Daniel A Hess
(74) *Attorney, Agent, or Firm* — Schwegman Lundberg & Woessner, P.A.

(57) ABSTRACT

A Self-Service Terminal (SST) that provides valuable media deposit features is enhanced with an apparatus fastened to an outside surface of the SST. The apparatus is adapted to receive an externally provided valuable media cassette and connect/interface a port of the cassette to an unload infeed port. A transaction interface is enhanced to identify the cassette as a source device for obtaining valuable media during a deposit transaction. The SST feeds the valuable media from the externally connected cassette through media validation and transport modules of the SST into cassettes of a safe and the SST returns rejected media for the deposit transaction back through the modules to return rejected media to the externally interfaced cassette.

17 Claims, 5 Drawing Sheets

APPARATUS, SYSTEM, AND METHOD FOR BULK CURRENCY NOTE DEPOSITS

CROSS-REFERENCE TO RELATED APPLICATION

This application is a continuation of U.S. patent application Ser. No. 17/690,259, filed Mar. 9, 2022, which is a continuation of U.S. patent application Ser. No. 17/238,390, filed Apr. 23, 2021, now U.S. Pat. No. 11,328,563, which applications and publications are incorporated herein by reference in their entirety.

BACKGROUND

Automated Teller Machines (ATMs) are designed for consumer convenience by allowing consumers to deposit funds, withdraw funds, and perform other account-based services without requiring assistance from a teller.

ATMs have been around for a long time and they were revolutionary in the financial industry when they first appeared some fifty to sixty years ago. ATMs have experienced many enhancements since first appearing in the industry. For example, deposit envelops are no longer needed for deposit transactions since most modern ATMs are equipped with imaging technology; voice guidance is provided for visually impaired consumers; touchscreen displays permit easy selection of interface options; remote video-based customer assistance is available on some ATMs, etc.

ATMs were designed for consumers and consumer-sized deposit and withdrawal transactions. Many small to medium sized businesses are still forced to perform large deposit transactions with a teller during normal business hours because the ATMs are only equipped to handle a bunch of checks and/or currency notes of 300 or less during check/note infeed operations. Businesses are rightly concerned with the safety of their employees carrying large bags of notes to an ATM for deposit while the employee counts out or feeds the ATM pre-sized bunches of notes for deposit transactions. This increases the time the employee is at the ATM with unsecured notes during the transaction. As a result, some businesses perform several deposits at different times during the day, some visit the bank during normal business hours for deposits, and/or some hire a cash transportation service to perform the deposits on behalf of the business.

As a result, many small to medium sized businesses have to safely store large amounts of currency notes on their premises for extended periods of time and/or have to make multiple bank visits throughout a day or a week. Businesses are concerned with cash being on site and may have to hire added security or take other expensive precautions for the protection of their employees.

SUMMARY

In various embodiments, an apparatus, a system, and a method for depositing bulk currency notes are provided.

According to an aspect, a method for performing a bulk currency note deposit by an Automated Teller Machine (ATM) is provided. A media cassette is detected as being interfaced to an apparatus that is externally affixed to the ATM during a deposit transaction being performed by a depositor at the ATM. The deposit transaction is processed by feeding media drawn from the media cassette through a depository/recycling device of the ATM into one or more of an exception bin, an escrow, and second media cassettes associated with a safe of the ATM.

DETAILED DESCRIPTION

Figure 1:
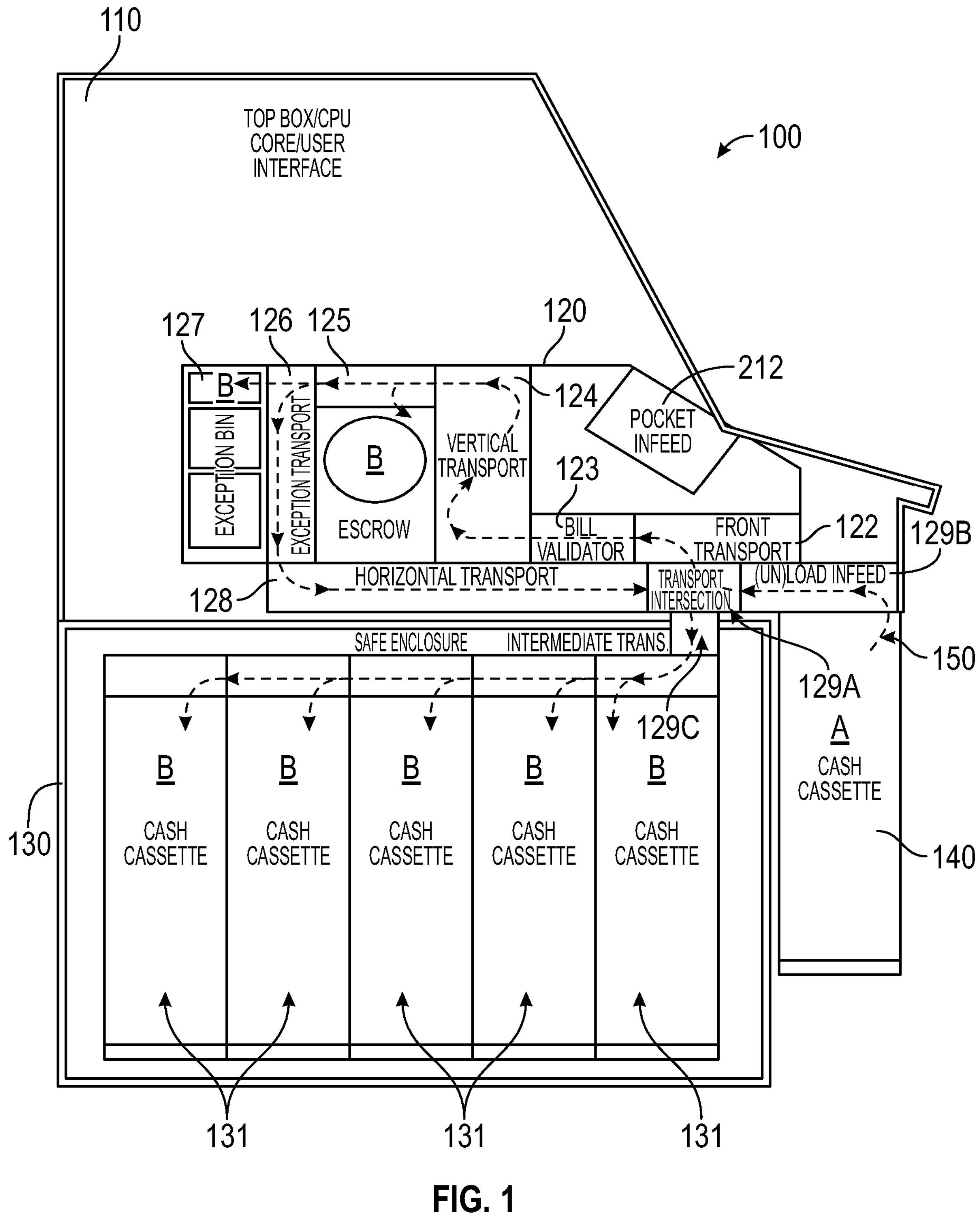
FIG. 1 is a diagram of a system for bulk currency note deposits; components of the system and note pathways within a depository during a bulk currency note deposit transaction are illustrated, according to an example embodiment.

FIG. 1 is a diagram of a system 100 for bulk currency note deposits; components of the system 100 and note pathways within a depository 120 during a bulk currency note deposit transaction are illustrated, according to an example embodiment. It is to be noted that system 100 is shown with only those components relevant to understanding what has been added and modified for purposes of processing bulk currency note deposit transactions.

System 100 provides an enhanced Self-Service Terminal (SST), such as an ATM, which permits currency notes to be processed in bulk during a deposit transaction via a novel apparatus 170 and enhanced deposit software features. A currency cassette 140 is externally attached and internally interfaced to a depository 120 during a deposit transaction with the currency notes automatically pulled from cassette 140, validated, counted, and deposited in cassettes 131 of safe 130 by depository 120. Any rejected notes (not validated) during the deposit can be returned by depository 120 back to cassette 140. Cassette 140 is removable/detachable and attachable via an exterior of system 100 through apparatus 170.

System 100 decreases cash handling required by a depositor during a deposit transaction; enables secure transfer of currency notes from cassette 140 to cassettes 131 of safe 130; reduces cash exposure risks associated with staff and fraudulent activities when handling large amounts of cash; increases self-service capabilities for small to medium sized businesses that frequently have large currency note deposit transactions; allows deposited cash to be immediately available to other customers of the ATM via currency recycling; reduces the currency replenishment cycles of the ATM with replenished currency coming from bulk deposit transactions at the ATM; and provides instant account credit for a bulk deposit to the account associated with the depositor.

As used herein the phrase "currency note" may be used interchangeably and synonymously with "cash." A currency note can be any government backed currency having a government assigned denomination ($1, $5, $10, $20, $50, $100, etc.).

A "bulk deposit" refers to a specific type of deposit transaction being performed by an operator of system 100 where the total amount of currency notes being deposit exceeds a maximum note threshold permitted by the pocket infeed 121 of depository/recycler 120. In an embodiment, the threshold is approximately 300 notes, such that a "bulk deposit transaction" is a deposit transaction that exceeds 300 notes being deposited.

However, it is to be noted that while system 100 permits bulk deposits for any deposit that exceeds a maximum number of currency notes, cassette 140 may be also be used for a deposit transaction when the total number of currency notes is under the maximum number. That is, system 100 permits any sized deposit (any total number of currency notes) to be deposited via cassette 140. For example, when the bulk deposit feature is activated by system 100, system 100 pulls the currency notes from cassette 140, there is not a requirement that cassette 140 hold more than the maximum number of currency notes. Once the bulk deposit feature is activated any total number of currency notes present in cassette 140 are processed through depository 120 into cassettes 131 of safe 130 and the deposit transaction is completed. In this way, system 100 can still be processed for an operator of system 100 when the total amount of currency notes for the deposit transaction is less than the maximum bunch size of pocket infeed 121.

System 100 comprises a top box 110, a depository/recycler 120, a safe 130, and attachable/detachable cassette 140 (shown as attached and loaded on the exterior front service of system 100 in FIG. 1).

Top box 110 comprises a housing for a computing core and user interface peripherals (such as a touchscreen display, card reader, etc.). An inside of top box 110 includes depository/recycler 120.

Depository/recycler 120 includes a variety of electromechanical components and hardware circuitry (e.g., printed circuit boards) for the components. Depository/recycler 120 includes electromechanical components for a pocket infeed 121, a front media transport 122, a note validator 123 (called "bill validator" in FIG. 1), a vertical media transport 124, an escrow 125, an exception transport 126, an exception media bin 127, a horizontal media transport 128, a transport intersection 129A, an unload infeed 129B, and a intermediary media transport 129C.

Safe 130 comprises cassettes 131.

Cassette 140 comprises a similar or a same memory, electromechanical components, pin connectors, and dimensions of that which are associated with safe cassettes 131 housed in safe 130. That is, cassette 140 is a cassette which could be swapped into or out of safe 130, such that the communication and access to cassette 140 is the same for depository/recycler 120 as that which is already associated with cassettes 131 of safe 130. This provides easy software integration of cassette 140 with depository/recycler 120 for access and control of cassette 140 by depository/recycler 120.

An existing deposit transaction interface is modified and enhanced as a new user interface 110. Interface 110 permits a new type of deposit transaction option/feature that is associated a source infeed for valuable media of the deposit being an externally attached cassette 140 instead of pocket infeed 121. This new type of deposit transaction option/feature can activated through interface 110 based on a customer account identifier associated with a customer card provided during the deposit transaction or provided through interface 110 for selection by a customer when a deposit transaction is selected by the customer from interface 110 and when CPU core 110 has detected a cassette 140 loaded into unload infeed 129B by the customer.

Once the new type of deposit transaction is detected for a given deposit transaction, a source infeed for the deposited notes is identified as unload infeed 129B instead of pocket infeed 121. This may further cause pocket infeed 121 to be deactivated and a shutter for pocket infeed 121 closed.

The depository/recycler 120 pulls each note from cassette 140 through unload infeed 129B into transport intersection 129A, each note is then fed into front transport 122. Front transport 122 is also interfaced to pocket infeed 121, such that path A 150 for each note pulled from cassette 140 traverses inside of depository/recycler 120 along a same path as if the notes were pulled from pocket infeed 121. Each note is urged along path A 150 from front transport 122 to note validator 123 where is note is identified for purpose of type (check or currency), any Magnetic Ink Character Recognition for any type of note associated with a check, denomination determination for currency notes, and counterfeit/damage determination for currency notes. Once the note is validated and labeled as to its type (by validator 123), denomination, check amount, and genuine or not (counterfeit or damaged), the notes are instantly directed to the appropriate destination. Thus, any note that is not recognized or is not clearly authenticated is temporarily held in escrow 125 along path A 150 and vertical transport 124 where the note is fed into escrow 125; the note is held until a final determination is made as to whether the note can be deposited or cannot. Notes that are considered suspect or counterfeit are either held in escrow 125 for return to cassette 140 or directed to exception bin 127 for investigation by authorities, depending on the suspect/counterfeit retention policy of the financial institution. Assuming a note is not going to be rejected and is verified, the note is urged along exception transport 126 to horizontal transport 128. Each note is then urged into transport intersection 129A, then down through intermediate transport 129C, and fed into the appropriate cash cassette 131 of safe 130. Each cassette 131 may be associated with a particular denomination of a currency note or set of denominations and one cassette 131 may be set aside for storage of checks. The deposit path 150 starts at A from cassette 140 and ends at a designation associated with B (can be exception bin, a particular currency cassette 131, and or remain temporarily on a drum associated with escrow 125 for returning back to cassette 140

During the bulk deposit transaction, the existing metrics are calculated as they normally would be for the currency notes being deposited by depository/recycler 120, such that usable currency notes are inventoried with the existing notes by denomination within cassettes 131. This allows the deposited currency to be recycled for withdrawals by other customers of system 100.

Similarly, depository/recycler 120 in conjunction with applications of CPU core 110 count and inventory acceptable notes/checks for the bulk deposit and provide a summary for review to the operator/depositor through interface 110. For example, a screen rendered on a display to the depository indicating that a total of $10,000 was deposited consisting of 500 $100 bills, 4 $50 bills, 10 $20 bills, and 1 check of $100. Any unacceptable notes are identified and returned back from escrow 125 to cassette 140 along path 160 (shown in FIG. 2 below). Suspect notes or counterfeit notes are retained within exception bin 127 and not returned to the depositor.

Figure 2:
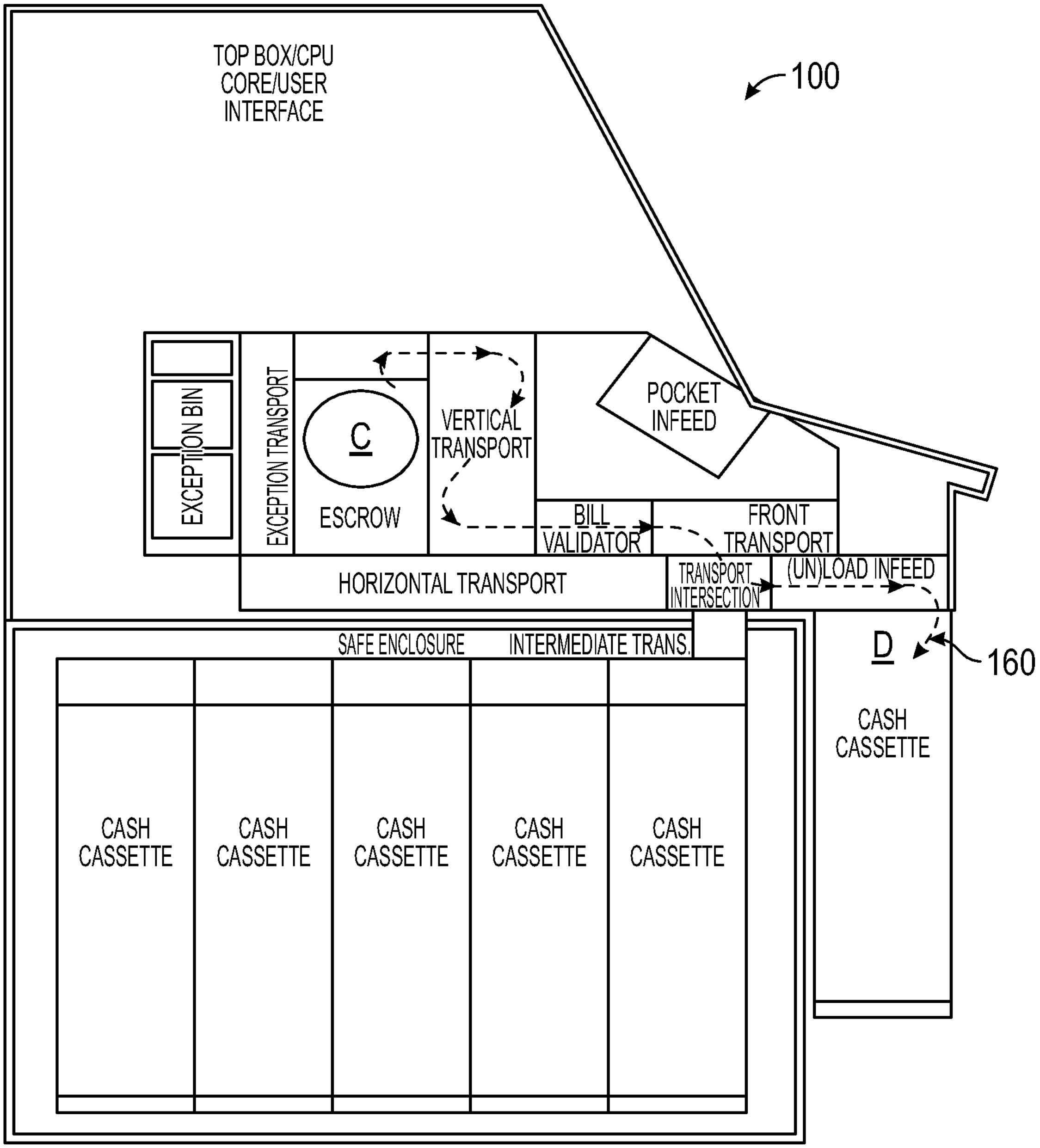
FIG. 2 is a diagram of the system further illustrating a returned or a rejected currency note pathway within the depository during a bulk currency note deposit transaction, according to an example embodiment.

FIG. 2 is a diagram of the system further illustrating a returned or a rejected currency note pathway within the depository during a bulk currency note deposit transaction, according to an example embodiment.

A rejected note that is returnable to the customer (such as a check with a missing account number or missing signature, a note associated with a foreign currency that is foreign to the depository/recycler 120 that the depository/recycler 120 was not configured to handle with the deposit transaction) is returned back over path 160 at C from escrow 125 to vertical transport 124 where it is urged back through bill validator 123, front transport 122, transport intersection 129A, and unload infeed 129B and stored back in cassette 140.

Figure 3:
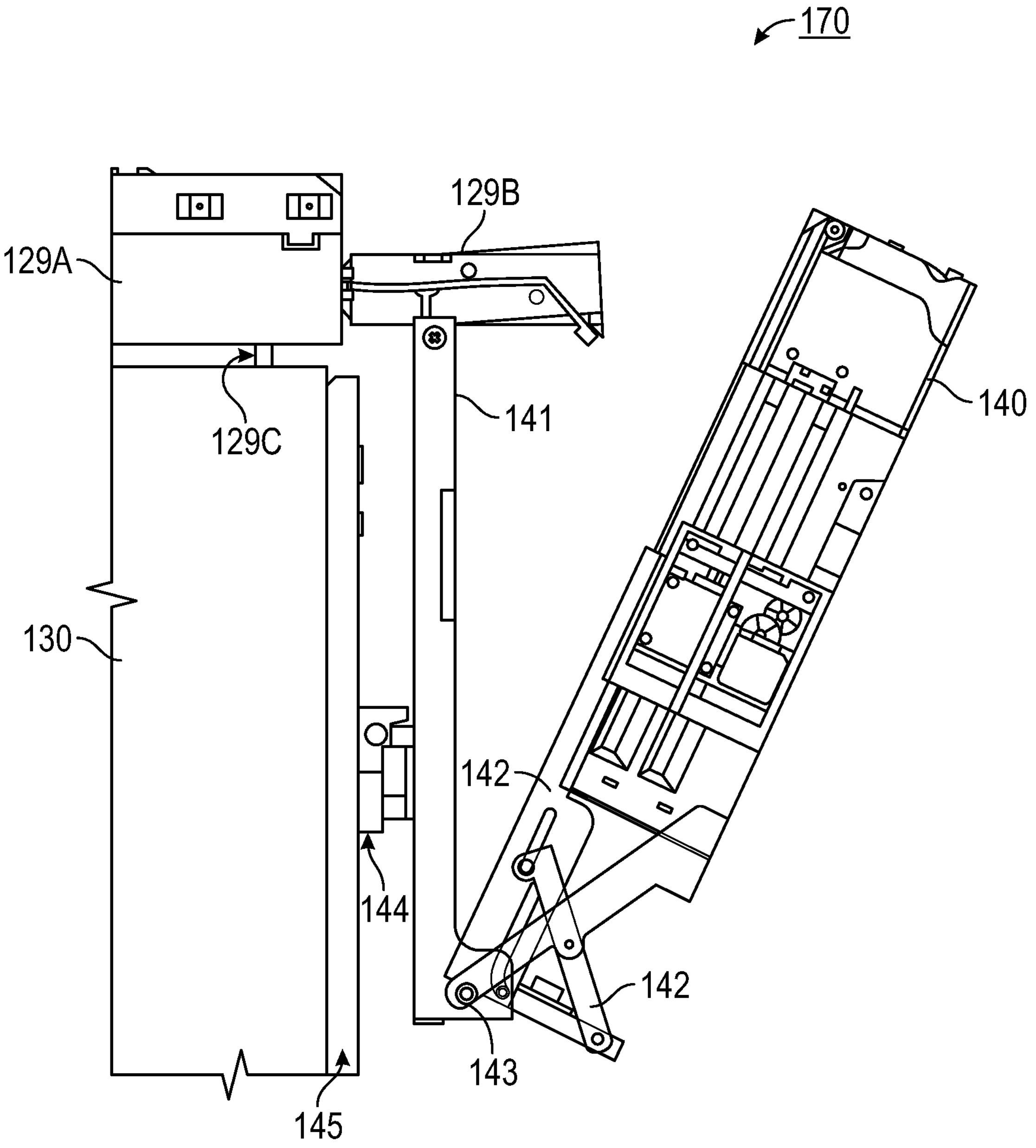
FIG. 3 is a diagram depicting an apparatus for attaching/detaching a currency cassette to the depository of the system for a bulk current note deposit transaction and for removal of the cassette after a bulk currency note deposit transaction has completed, according to an example embodiment.

FIG. 3 is a diagram depicting an apparatus 170 for attaching/detaching a currency cassette 140 to the depository/recycler 120 of the system 100 for a bulk current note deposit transaction and for removal of the cassette 140 after a bulk currency note deposit transaction has completed, according to an example embodiment.

The apparatus 170 comprises unload infeed 129B, vertical cassette holding brace/bracket 141, and cassette port holder 142. Brace 141 is fastened to an underside surface of unload infeed 129 and further fastened to extender 144. Extender 144 is fastened to a backside surface of brace 141 and a front side surface of front brace 145. Front brace 145 is fastened on its backside surface to a frontside exterior surface of safe 130 and fastened on a portion of its frontside surface to extender 144.

Cassette port holder 142 comprises a hinged or pivot member 143 adapted to permit port holder 142 to extend away from brace 141 in a direction associated with an operator of system 100 (the depositor). This permits holder 142 to be rotated and pulled towards the depositor and cassette 140 inserted into holder 142 for loading and unloading of cassette 140.

Extender 144 provides a gap or space between brace 141 and front brace 145; the space or gap along with a location of where brace/bracket 141 is fastened to the underside surface of unload infeed 129 ensures that a port opening on cassette 140 aligns with and connects to a port opening on unload infeed 129B.

Extender 144 provides stability and reduction in force (weight) associated with cassette 140 when being loaded or when cassette 140 is fully loaded into port holder 142 on the underside of unload infeed 129B. This ensures that over time unload infeed 1296 is not pulled downward and loosened from its connection to transport intersection 129A.

An interface port/opening to cassette 140 aligns with and snaps into a corresponding interface port on unload feeder 129B when cassette 140 is fully loaded for a bulk deposit transaction into system 100.

FIG. 3 illustrates apparatus 170 in a loading/unloading position with port holder 142 extended away from a front surface of safe 130 for the loading or unloading of cassette 140 from system 100. A fully loaded cassette 140 into system 100 is illustrated in FIG. 4. below.

Figure 4:
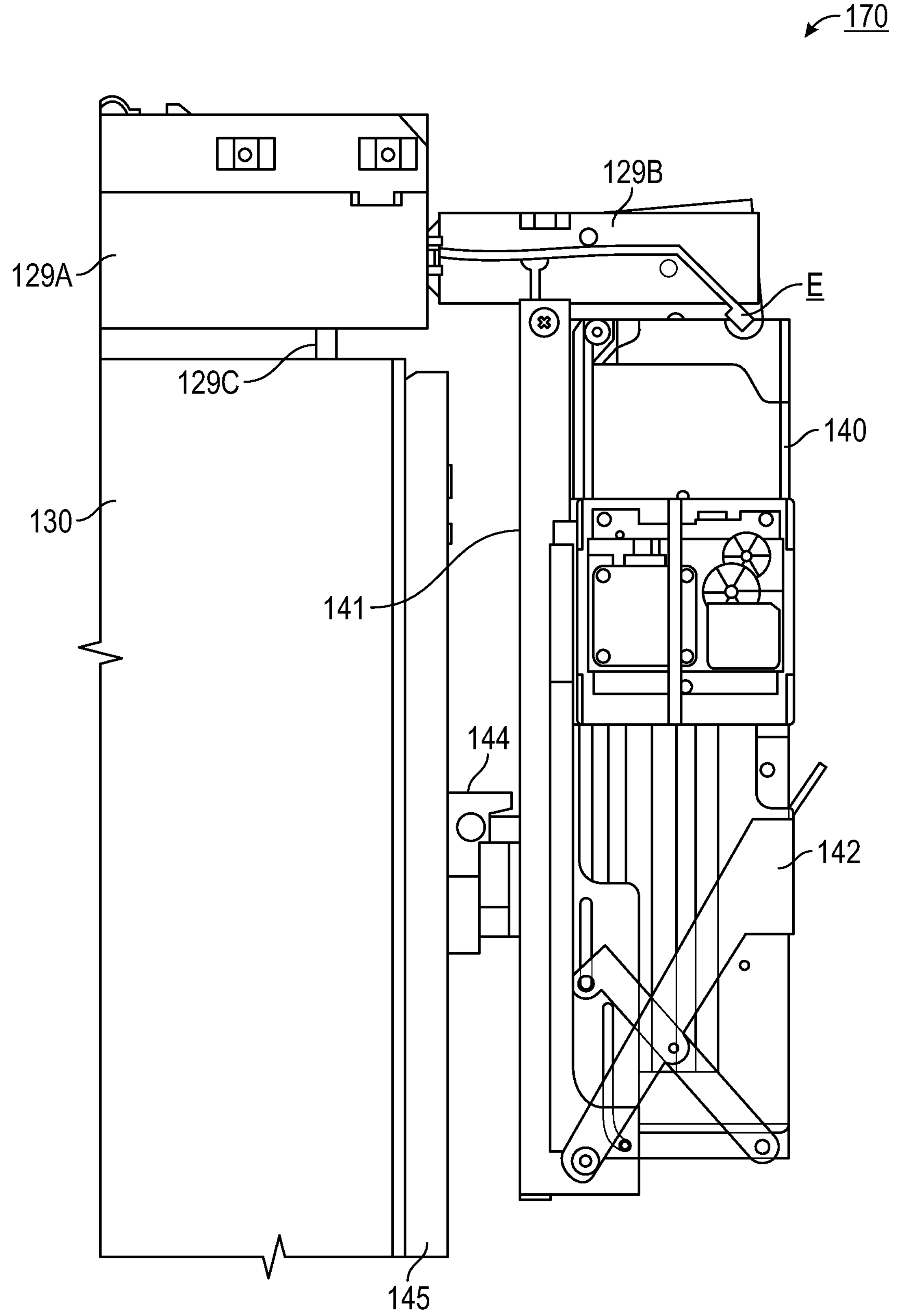
FIG. 4 is a diagram the apparatus of FIG. 3 with the currency cassette loaded, attached, and interfaced to the system for performing a bulk currency note deposit transaction, according to an example embodiment.

FIG. 4 is a diagram the apparatus 170 of FIG. 3 with the currency cassette 140 loaded, attached, and interfaced to depository/recycler 120 for performing a bulk currency note deposit transaction with system 100, according to an example embodiment.

Once loaded and snapped into place interface ports of both cassette 140 and unload infeed 129B align automatically at location E as labeled in FIG. 4. This creates path 150 (deposit notes being deposited) and path 160 (returned notes or checks) between unload infeed 129B and cassette 140.

One now appreciates how system 100 and apparatus 170 provide bulk deposit transactions that do not require the depositor to manually feed the notes and/or checks associated with the deposit. This extends and enhances the ATM's existing capabilities and features by removing the valuable media bunch limit with respect to a maximum number of notes/checks, which is permissible through the ATM's existing pocket infeed.

Furthermore, security for the depositor is improved because a large deposit transaction does not require manually feeding pre-stacked bunches of valuable media into the pocket infeed, such that the deposit transaction is performed more quickly by the ATM reducing the depositor's time at the ATM for the transaction and thereby potential for attracting a robber or thief.

All of the ATM's existing note/bill validation, rejection, and return capabilities are processed normally on the notes and/or checks that are provided through cassette 140 with a modified note path 150 that intersects the normal/existing note path at the front transport 122. Similar notes or checks that are rejected are provided over a modified return note path 160 that comprises the normal/existing return note path at the transport intersection with a new unload feed return path for direct return to cassette 140. Both deposit path 150 and return path 160 add transport length to the ATM to account for a newly added unload infeed 129B, which is connected to transport intersection 129A on one end and connected to a port interface of a loaded cassette 140 on an opposite end. System 100 can comprise an existing ATM enhanced by adding apparatus 170 and by modifying existing deposit transaction processing for automatically recognizing, automatically providing a cassette-based or bulk deposit option for cassette 140, and automatically connecting with cassette 140 to obtain deposited notes and/or checks from cassette 140 rather than pocket infeed 121.

Figure 5:
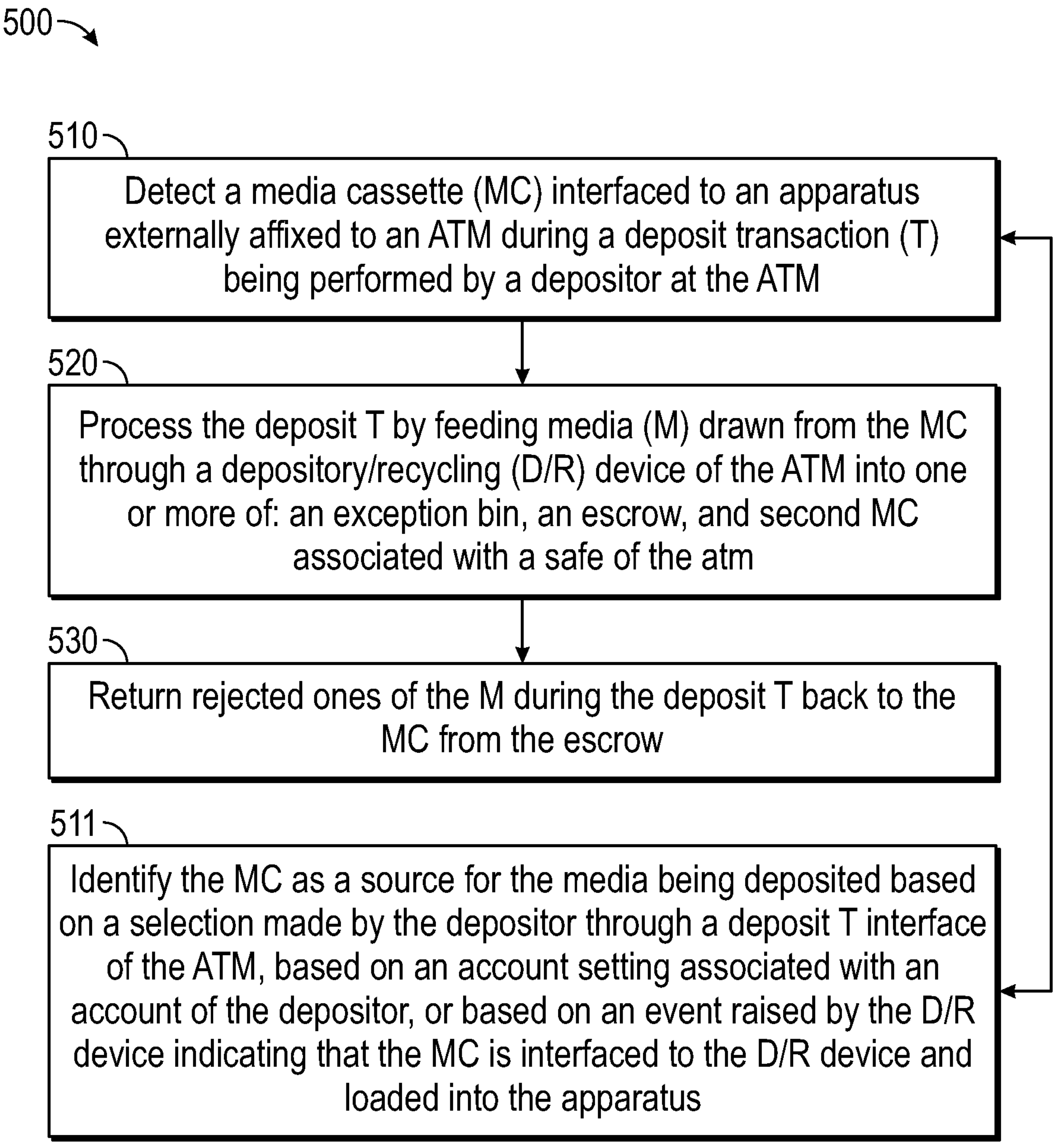
FIG. 5 is a diagram of a method for performing a bulk currency note deposit transaction by the system of FIG. 1, according to an example embodiment.

FIG. 5 is a diagram of a method 500 for performing a bulk currency note deposit transaction by the system 100 of FIG. 1, according to an example embodiment. The method is implemented by executable instructions as one or more software modules referred to a "bulk deposit manager." The executable instructions reside in a non-transitory computer-readable storage medium and when provided to one or more processors of system 100 cause the one or more processors to perform the method 500.

Bulk deposit manager causes valuable media housed within cassette 140 to be urged along path A 150 through depository/recycler 120 into escrow 125 or cassettes 131 and causes rejected valuable media that is returnable to the depositor to be returned along path B 160 from escrow 125 back into cassette 140.

At 510, the bulk deposit manager detects a media cassette 140 interfaced to an apparatus 170. The apparatus 170 is externally affixed to an ATM 100 during a deposit transaction being performed by a depositor at the ATM 100.

In an embodiment, at 511, the bulk deposit manager identifies the media cassette 140 as a source device for the media being deposited based on: a selection made by the depositor through a deposit transaction interface 110 of the ATM 100, based on an account setting associated with an account of the depositor, or based on an event raised by a depository/recycling device 120 of the ATM 100 indicating that the media cassette 140 is interfaced to the depository/recycling device 120 and loaded into the apparatus 170.

At 520, the bulk deposit manager processed the deposit transaction by feeding media drawn from the media cassette 140 through the depository/recycling module 120 of the ATM 100 into one or more of: an exception bin 127, an escrow 125, and second media cassettes 131 associated with a safe 130 of the ATM 100.

In an embodiment, at 530, the bulk deposit manager returns rejected ones of the media during the deposit transaction back to the media cassette 140 from the escrow 125.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A media cassette apparatus, comprising:

a holding brace affixed to an external surface of a transaction terminal; and a media cassette holder coupled to the holding brace and configured to facilitate automated bulk note deposit transactions;

wherein when the attachable media cassette is loaded into the media cassette holder a first port of the media cassette aligns to and is adjacent to a second port of a media infeed module of the transaction terminal to create a path for notes to be deposited into the transaction terminal and rejected notes to be returned from the transaction terminal when rejected during a bulk note deposit at the transaction terminal using the notes stored in the media cassette;

wherein the holding brace is a vertical brace affixed to the external surface of the transaction terminal under the second port of the media infeed module of the transaction terminal;

wherein the media cassette holder is affixed to a second brace and the second brace affixed to a first side of an extender while a second side of the extender is affixed to the holding brace.

2. The media cassette apparatus of claim 1, wherein the media cassette holder is adapted to permit the media cassette to be attached to and removed from the media cassette holder.

3. The media cassette apparatus of claim 1 further comprising, a pivot member adapted to permit the media cassette holder to extend away from the transaction terminal in a direction associated with an operator of the terminal to insert the media cassette into the media cassette holder for the bulk note deposit at the transaction terminal.

4. The media cassette apparatus of claim 3 further comprising, an extender attached along a bottom portion of the holding brace to extend the media cassette holder out away from the external surface of the transaction terminal.

5. The media cassette apparatus of claim 4 further comprising, a second brace attached to the extender along a bottom portion of the second brace, wherein the second brace affixed to the media cassette holder.

6. The media cassette apparatus of claim 1, wherein the first port of the media cassette snaps into alignment with the second port of a media infeed module of the transaction terminal when the media cassette is inserted into the media cassette holder.

7. The media cassette apparatus of claim 1, wherein the holding brace and the media cassette holder are located under the second port of the media infeed module of the transaction terminal.

8. The media cassette apparatus of claim 1, wherein the media cassette holder comprises three side walls and a base adapted to receive the media cassette that rest on the base and is in contact with the three side walls when inserted into the media cassette holder.

9. The media cassette apparatus of claim 1, wherein the transaction terminal is configured to identify the media cassette when the first port is aligned with the second port as a source cassette to obtain the notes from during the bulk note deposit.

10. A transaction terminal, comprising:

a depository or a recycler comprising a media infeed module for receiving and dispensing notes along a media transport and media cassettes into which the notes are stored in or dispensed from;

a computing core for processing deposit transaction and dispense transactions using the depository or the recycler;

a touchscreen display;

a housing comprising computing core, components of the touchscreen display, and the depository or the recycler; and a media cassette holder affixed to an external surface of the housing underneath the media infeed module and configured to enable automated bulk note deposit transactions;

wherein the media cassette holder adapted to receive a deposit media cassette with a first port of the deposit cassette aligned with a second port of the media infeed module;

wherein the computing core is configured to identify the first port aligned with the second port during a bulk note deposit transaction, urge deposit notes from the deposit media cassette out of the deposit media cassette through the first port, the second port, on to the media transport, into the corresponding media cassettes, maintain deposit details for the deposit notes, and present the deposit details on the touchscreen display to a depositor associated with the bulk note deposit transaction;

wherein the computing core is further configured to identify unfit notes from the deposit notes of the deposit media cassette, maintain unfit note deposit details, present the unfit deposit details on the touchscreen display to the depositor, urge the unfit notes along the media transport through the second port, the first port, and back into the deposit media cassette.

11. The transaction terminal of claim 10, wherein the computing core is further configured to temporarily store the deposit notes in an escrow along the media transport until each deposit note is identified as being either fit for deposit or identified as being one of the unfit notes.

12. The transaction terminal of claim 10, wherein the computing core is further configured to present a denomination count for each note denomination to the depositor through the touchscreen display along with a total value determined for the bulk note deposit transaction based on the deposit notes processed from the deposit media cassette.

13. The transaction terminal of claim 12, wherein the computing core is further configured to separate the deposit notes from checks received from the deposit media cassette, maintain check details and check totals for the checks, and present the check details and check totals to the depositor through the touchscreen display along with a total note value approved for the bulk note deposit transaction and a total check value approved for the bulk note deposit transaction.

14. The transaction terminal of claim 13, wherein the computing core is further configured to return unacceptable checks and unfit notes determined for the bulk note deposit transaction back through the media transport through the second port, through the first port, and back into the deposit media cassette.

15. The transaction terminal of claim 10, wherein the computing core is further configured to identify the deposit media cassette as a source for the deposit notes of the bulk note deposit transaction based on an account or an option selected by the depository through the touchscreen display during the bulk note deposit transaction.

16. A method, comprising:

identifying a media cassette loaded into an apparatus externally affixed to a transaction terminal during a deposit transaction being performed by a depositor at the transaction terminal;

automating a bulk note deposit transaction by drawing media items out of the media cassette onto a media transport of the transaction terminal;

tabulating a total amount of the media items received into second media cassettes of the transaction terminal from the media transport;

tabulating a second total amount of the media items unfit for deposit;

presenting on a display of the transaction terminal the total amount and the second total amount to the depository; and urging the media items associated with the second total amount off of an escrow and back along the media transport and back into the media cassette of the depositor.

17. The method of claim 16, wherein drawing further includes identifying the media items as denominations of cash and checks which the depositor is attempting to deposit at the transaction terminal from the media cassette during the deposit transaction.

* * * * *